United States Patent
Hutter et al.

(10) Patent No.: US 12,314,819 B2
(45) Date of Patent: May 27, 2025

(54) METHOD AND CONTROL DEVICE FOR GENERATING TRAINING DATA FOR TRAINING A MACHINE LEARNING ALGORITHM

(71) Applicant: Robert Bosch GmbH, Stuttgart (DE)

(72) Inventors: Frank Hutter, Freiburg Im Breisgau (DE); Samuel Gabriel Mueller, Freiburg Im Breisgau (DE)

(73) Assignee: ROBERT BOSCH GMBH, Stuttgart (DE)

( * ) Notice: Subject to any disclaimer, the term of this patent is extended or adjusted under 35 U.S.C. 154(b) by 525 days.

(21) Appl. No.: 17/657,396

(22) Filed: Mar. 31, 2022

(65) Prior Publication Data
US 2022/0351498 A1 Nov. 3, 2022

(30) Foreign Application Priority Data
Apr. 30, 2021 (DE) .................. 20 2021 102 338.4

(51) Int. Cl.
*G06V 10/774* (2022.01)
*G06N 20/00* (2019.01)
*G06V 10/764* (2022.01)

(52) U.S. Cl.
CPC ........... *G06N 20/00* (2019.01); *G06V 10/764* (2022.01); *G06V 10/774* (2022.01)

(58) Field of Classification Search
CPC ...... G06N 20/00; G06N 5/046; G06V 10/764; G06V 10/774; G06F 18/2148; G06F 18/28; G06T 3/60
USPC .................................................. 382/100, 159
See application file for complete search history.

(56) References Cited

U.S. PATENT DOCUMENTS

| | | | |
|---|---|---|---|
| 11,967,015 B2* | 4/2024 | Shan | G06N 3/045 |
| 2019/0354895 A1 | 11/2019 | Vasudevan et al. | |
| 2020/0294287 A1* | 9/2020 | Schlemper | G06T 5/70 |
| 2021/0034921 A1* | 2/2021 | Pinkovich | G06V 10/764 |
| 2021/0035563 A1* | 2/2021 | Cartwright | G06N 3/084 |
| 2021/0319266 A1* | 10/2021 | Chen | G06V 10/764 |

OTHER PUBLICATIONS

Müller et al., "Trivialaugment: Tuning-Free yet State-Of-The-Art Data Augmentation," Cornell University, 2021, pp. 1-13. <https://arxiv.org/pdf/2103.10158.pdf> Downloaded Mar. 30, 2022.

* cited by examiner

*Primary Examiner* — Sheela C Chawan
(74) *Attorney, Agent, or Firm* — NORTON ROSE FULBRIGHT US LLP

(57) ABSTRACT

A method for generating training data for training a machine learning algorithm. The method includes the following steps: providing first training data and generating additional training data from at least one portion of the first training data, wherein the additional training data are generated in each case by applying, to all the training data included in the at least one portion of the first training data, an augmentation function randomly selected from a set of possible augmentation functions; providing the first training data and the additional training data for training the machine learning algorithm.

15 Claims, 2 Drawing Sheets

METHOD AND CONTROL DEVICE FOR GENERATING TRAINING DATA FOR TRAINING A MACHINE LEARNING ALGORITHM

CROSS REFERENCE

The present application claims the benefit under 35 U.S.C. § 119 of German Patent Application No. DE 20 2021 102 338.4 filed on Apr. 30, 2021, which is expressly incorporated herein by reference in its entirety.

FIELD

The present invention relates to a method and to a control device for generating training data for training a machine learning algorithm, and in particular to a control device that is configured to generate additional training data in a simple manner and using few resources.

BACKGROUND INFORMATION

The basis of machine learning algorithms is that statistical methods are used to train a data processing system such that it can execute a particular task without having originally been explicitly programmed to do so. The aim of machine learning is to construct algorithms that can learn from data and make predictions. These algorithms create mathematical models by which data can be classified, for example.

In the process, for example, a system to be modeled can be captured by measurements, and an empirical model can be created on the basis of measured values, for example, and a machine learning algorithm can be trained accordingly. In this case, however, situations may occur where, for example, it is impossible to fully measure a process to be modeled or a system to be modeled. The consequence of this may be that only partial data from a subspace are available for forming the empirical model or for training the machine learning algorithm accordingly; during operation, however, process states that are not covered by said training data may also occur.

Augmentation methods have been proposed as a solution to this problem, i.e. methods for generating additional training data. A drawback of conventional augmentation methods is, however, that they are very complex and require a lot of computer resources, in particular memory and processor capacities, meaning that said methods are difficult to implement using conventional data processing systems.

U.S. Patent Application Publication No. US 2019/0354895 A1 describes a method for learning a data supplementation policy for training a machine learning algorithm, training data for training a machine learning algorithm being received and a plurality of data supplementation policies being determined by generating a current data supplementation policy based on quality parameters of a previous data supplementation policy, the machine learning algorithm being trained on the basis of the current data supplementation policy, and quality parameters in relation to the current data supplementation policy being determined after the machine learning algorithm has been trained on the basis of the current data supplementation policy, a data supplementation policy based on the quality parameters of the individual data supplementation policies then being selected.

SUMMARY

An object addressed by the present invention is to provide an improved control device for generating training data for training a machine learning algorithm.

The object may be achieved by a control device for generating training data for training a machine learning algorithm as per the features of the present invention.

Advantageous specific embodiments and developments are set out in the description with reference to the figures.

According to a specific embodiment of the present invention, this object is achieved by a control device for generating training data for training a machine learning algorithm, the control device comprising a first providing unit, which is configured to provide first training data, a generation unit, which is configured to generate additional training data from at least one portion of the first training data, the additional training data being generated by the generation unit by in each case applying, to all the training data included in the at least one portion of the first training data, an augmentation function randomly selected from a set of possible augmentation functions, and a second providing unit, which is configured to provide the first training data and the additional training data for training the machine learning algorithm.

In this context, augmentation should be understood as methods for expanding or supplementing input data, in particular training data for training a machine learning algorithm, further or additional data being generated in particular by duplicating and varying the input data. The functions applied to the input data in the process in order to generate the additional data are referred to as augmentation functions, and the totality of the augmentation functions forms the set of possible augmentation functions.

In this case, the training data form a dataset for training the machine learning algorithm such that it then covers, as far as possible, all the states of a modeled system or modeled process.

In accordance with an example embodiment of the present invention, the control device, and in particular the generation unit, are thus configured such that the additional training data are generated simply by respectively applying a single augmentation function to the first training data without, for example, data supplementation policies having to be learned first, which is complex and resource-intensive. As a result, additional training data can be generated in a simple manner and using few resources, meaning that the control device can also be configured on conventional data processing systems or implemented by them. Unlike other control devices that are configured to execute augmentation methods, it is furthermore apparent that the control device is configured such that good results can be achieved very reliably when generating additional training data. Overall, therefore, an improved control device for generating training data for training a machine learning algorithm is provided.

In one specific embodiment of the present invention, the generation unit is configured in particular to generate additional training data from the at least one portion of the first training data by furthermore in each case randomly selecting, for all the training data included in the at least one portion of the first training data, a degree of intensity for the augmentation function from a set of possible degrees of intensity, and in each case generating, for all the training data included in the at least one portion of the first training data, additional training data by applying the corresponding, randomly selected augmentation function to the training data while using the corresponding, randomly selected degree of intensity.

In this context, the degree of intensity for the augmentation function should be understood as a degree of intensity of the augmentation function applied in each case to the training data, i.e., how intensely or the level of intensity with which the corresponding, randomly selected augmentation function is applied in each case. For example, the degree of intensity can indicate by how many degrees an image should be rotated if the first training data are image data and a corresponding augmentation function is a rotation of image data. In the process, the totality of all possible degrees of intensity in turn forms the set of all possible degrees of intensity. The fact that the additional training data are generated using the corresponding, randomly selected degree of intensity thus means that the randomly selected degree of intensity is taken into account when the corresponding, randomly selected augmentation function is applied.

As a result, the control device, and in particular the generation unit, may more particularly also be configured such that, as is common in conventional augmentation methods, additional parameters can be taken into account or used when generating additional training data, but without said additional training data having to be learned beforehand, which is complex and resource-intensive.

In addition, all the elements of the set of possible augmentation functions can each have the same probability of being selected and/or all the elements of the set of possible degrees of intensity can each have the same probability of being selected. As a result, after a certain amount of time, any possible augmentation function and any possible degree of intensity can be applied at approximately the same frequency and the additional training data can reflect predetermined or pre-set criteria as accurately as possible.

In addition, the first training data can be image data.

In this case, the augmentation functions can comprise solarization of image data, posterization of image data, a brightness change to image data, shearing of image data, rotation of image data, a contrast change to image data and/or cutting of at least one portion out of image data.

Solarization of image data should be understood as a distortion of image data due to severe overexposure.

Moreover, posterization should be understood as the photographic effect of tonal separation with simultaneous reduction in tones.

Moreover, a brightness change should be understood as an adjustment to the brightness of the image data.

Moreover, shearing should be understood as an affine transformation of a plane onto itself; for example, shearing maps an image of a rectangle onto a parallelogram.

In addition, rotation means that the image data are rotated about an axis of rotation.

Moreover, a contrast change brings about an adjustment to the color depth or to the difference between light and dark regions in the image data.

In addition, at least one portion being cut out of image data means that at least one portion is removed from the corresponding image data in each case.

Since augmentation functions of this kind are available, the control device can thus be configured to implement the supplementary training data in a simple manner on the basis of conventional augmentation functions, without augmentation functions having to be implemented first, which is complex and resource-intensive.

By way of another specific embodiment of the present invention, a control device for training a machine learning algorithm is also provided, the control device being configured to train the machine learning algorithm on the basis of training data generated by an above-described control device for generating training data for training a machine learning algorithm.

A control device of this kind may be advantageous in that it is configured to train the machine learning algorithm on the basis of an improved dataset or an improved set of training data. In particular, the control device is configured such that additional training data are generated by simply applying a single augmentation function to the first training data, without, for example, data supplementation policies having to be learned first, which is complex and resource-intensive. As a result, additional training data can be generated in a simple manner and using few resources, meaning that the control device can also be configured on conventional data processing systems or implemented by them. Unlike other augmentation methods, it is furthermore apparent that good results can be achieved very reliably when generating additional training data.

The machine learning algorithm can, for example, be an algorithm for image classification or an algorithm for object recognition. In particular, on the basis of the training dataset generated, it is possible to influence a classification carried out by the machine learning algorithm after the training, and in particular it is possible to optimize a subsequent classification by the machine learning algorithm.

By way of another specific embodiment of the present invention, a control device for classifying image data is also disclosed, the control device being configured to classify image data using a machine learning algorithm, and the machine learning algorithm having been trained using an above-described control device.

In particular, the control device can be used to classify image data, in particular digital image data, on the basis of low-level features, for example edges or pixel attributes. In the process, an image processing algorithm can additionally be used in order to analyze a classification result that focuses on corresponding low-level features.

Thus, a control device is provided for classifying image data, said control device being based on a machine learning algorithm that has been trained on an improved training dataset. In particular, additional training data have been generated in the process by simply applying a single augmentation function to the first training data, without, for example, data supplementation policies having to be learned first, which is complex and resource-intensive. As a result, additional training data were able to be generated in a simple manner and using few resources, meaning that the control device can also be configured in particular on conventional data processing systems or implemented by them. Unlike other augmentation methods, it is furthermore apparent that good results can be achieved very reliably when generating additional training data.

The present invention provides an improved control device for generating training data for training a machine learning algorithm.

In particular, in accordance with an example embodiment of the present invention, what is provided is a control device that is configured such that the additional training data are generated by simply applying a single augmentation function to first training data, without, for example, data supplementation policies having to be learned first, which is complex and resource-intensive. As a result, additional training data can be generated in a simple manner and using few resources, meaning that the control device can also be configured on conventional data processing systems or implemented by them. Unlike other control devices that are configured to execute augmentation methods, it is furthermore apparent that the control device is configured such that good results can be achieved very reliably when generating additional training data.

Furthermore, the additional training data can be generated by a method as set out below and numbered consecutively.

1. A method for generating training data for training a machine learning algorithm, wherein the method comprises the following steps:
   providing first training data;
   generating additional training data from at least one portion of the first training data, wherein the additional training data are generated in each case by applying, to all the training data included in the at least one portion of the first training data, an augmentation function randomly selected from a set of possible augmentation functions; and
   providing the first training data and the additional training data for training the machine learning algorithm.
2. The method as recited in point 1, wherein the step of generating additional training data from the at least one portion of the first training data further comprises in each case randomly selecting, for all the training data included in the at least one portion of the first training data, a degree of intensity for the augmentation function from a set of possible degrees of intensity, and generating additional training data by applying the corresponding, randomly selected augmentation function to the training data while using the corresponding, randomly selected degree of intensity.
3. The method as recited in point 2, wherein all the elements of the set of possible augmentation functions each have the same probability of being selected and/or all the elements of the set of possible degrees of intensity each have the same probability of being selected.
4. The method as recited in one of points 1 through 3, wherein the first training data are image data.
5. The method as recited in point 4, wherein the augmentation functions comprise solarization of image data, posterization of image data, a brightness change to image data, shearing of image data, rotation of image data, a contrast change to image data and/or cutting of at least one portion of image data.
6. A method for training a machine learning algorithm, wherein the machine learning algorithm is trained on the basis of training data generated by a method for generating training data for training a machine learning algorithm as recited in one of points 1 through 5.
7. The method as recited in point 6, wherein the machine learning algorithm is an algorithm for image classification or an algorithm for object recognition.
8. A method for classifying image data, wherein the image data are classified using a machine learning algorithm, and wherein the machine learning algorithm has been trained using a method as recited in point 7.

The above-described embodiments and developments can be combined in any manner.

Further possible embodiments, developments and implementations of the present invention also include combinations of features of the present invention described above or below in relation to the embodiment examples, even if the combinations are not explicitly mentioned.

BRIEF DESCRIPTION OF THE DRAWINGS

The figures are intended to give a broader understanding of the specific embodiments of the present invention. They illustrate specific example embodiments and, together with the description, are aimed at explaining principles and features of the present invention.

Other specific embodiments and many of the aforementioned advantages will become clear in relation to the figures. The elements shown in the figures are not necessarily to scale.

DETAILED DESCRIPTION OF EXAMPLE EMBODIMENTS

Figure 1:
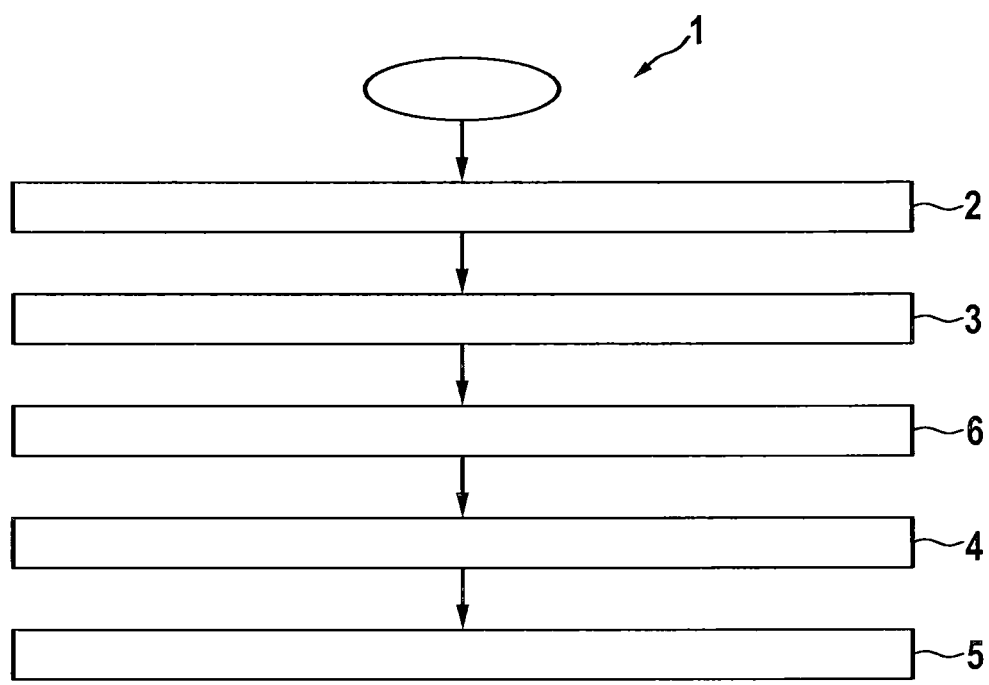
FIG. 1 is a flow diagram of a method for generating training data for training a machine learning algorithm according to an example embodiment of the present invention.

In the figures, identical reference numerals designate identical or functionally identical elements, components or component parts, unless indicated otherwise.

FIG. 1 is a flow diagram of a method 1 for generating training data for training a machine learning algorithm according to an example.

The basis of machine learning algorithms is that statistical methods are used to train a data processing system such that it can execute a particular task without having originally been explicitly programmed to do so. The aim of machine learning is to construct algorithms that can learn from data and make predictions. These algorithms create mathematical models by which data can be classified, for example.

In the process, for example, a system to be modeled can be captured by measurements, and an empirical model can be created on the basis of measured values, for example, and a machine learning algorithm can be trained accordingly. In this case, however, situations may occur where, for example, it is impossible to fully measure a process to be modeled or a system to be modeled. The consequence of this may be that only partial data from a subspace are available for forming the empirical model or for training the machine learning algorithm accordingly; during operation, however, process states that are not covered by said training data may also occur.

Augmentation methods are proposed as a solution to this problem, i.e. methods for generating additional training data. A drawback of conventional augmentation methods is, however, that they are very complex and require a lot of computer resources, in particular memory and processor capacities, meaning that said methods are difficult to implement using conventional data processing systems.

According to the example in FIG. 1, a method 1 for generating training data for training a machine learning algorithm is disclosed, first training data first being provided in a step 2. In a step 3, an augmentation function is then randomly selected from a set of possible augmentation functions, and in a subsequent step 4, additional training data are generated by applying the corresponding, randomly selected augmentation function to training data from the first training data, for example an image within the first training data. In a step 5, the first training data and the additional training data are then provided for training the machine learning algorithm.

Overall, FIG. 1 thus shows an example of a method 1 for generating training data for training a machine learning algorithm by which additional training data have been generated by simply applying a single augmentation function to the first training data, without, for example, data supplementation policies having to be learned first, which is complex and resource-intensive. Unlike other augmentation methods, it is furthermore apparent that good results can be achieved very reliably by the method 1.

FIG. 1 further shows a step 6 of randomly selecting a degree of intensity for the augmentation function from a set of possible degrees of intensity, wherein the additional training data in step 4, comprises, by applying the corresponding augmentation function, randomly selected in step 2, to the training data while using the corresponding degree of intensity randomly selected in step 6. However, it should be noted that a degree of intensity need not be applied for all the augmentations; in other words, a degree of intensity of zero can also be selected in step 6.

According to the example in FIG. 1, all the elements of the set of possible augmentation functions also each have the same probability of being selected and all the elements of the set of possible degrees of intensity each have the same probability of being selected.

In addition, the first training data are image data, the augmentation functions comprising solarization of image data, posterization of image data, a brightness change to image data, shearing of image data, rotation of image data, a contrast change to image data and/or cutting of at least one portion of image data.

Figure 2:
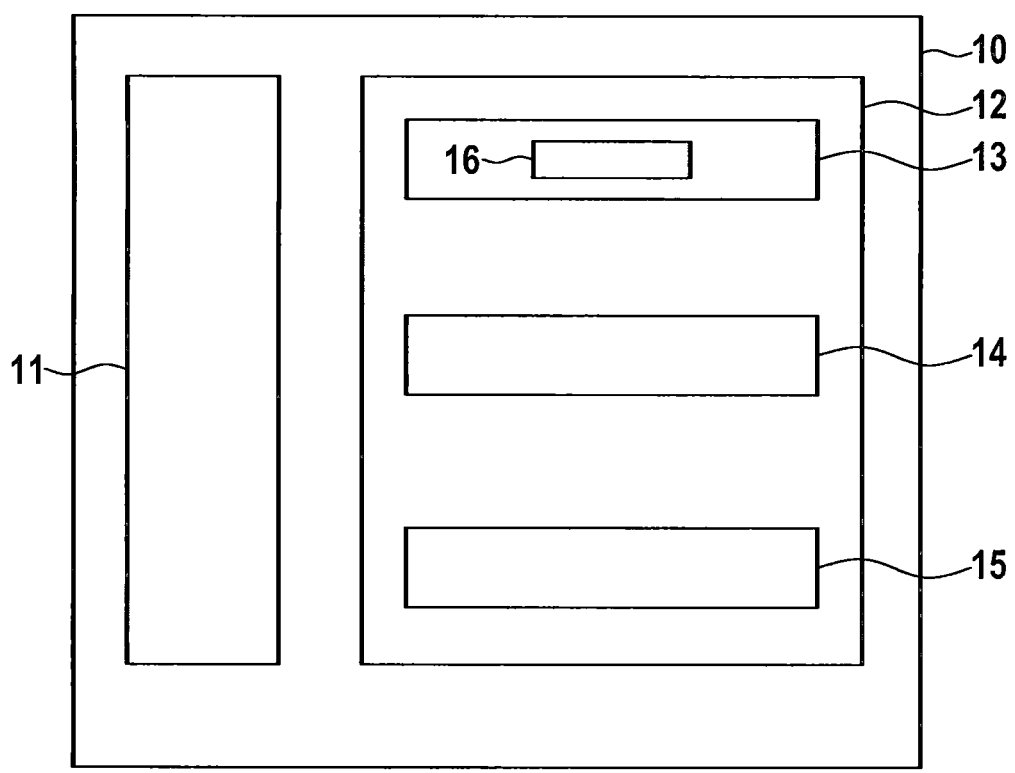
FIG. 2 is a block diagram of a control device for training a machine learning algorithm according to specific embodiments of the present invention.

FIG. 2 is a block diagram of a control device 10 for training a machine learning algorithm according to specific embodiments of the present invention.

As shown in FIG. 2, the control device 10 comprises a training unit 11 for training a machine learning algorithm, and a control device 12 for generating training data for training a machine learning algorithm, the training unit 11 being configured to use training data, generated by a control device 12, to train the machine learning algorithm.

In this case, the training unit can, for example, be implemented on the basis of code that is stored in a memory and executable by a processor.

According to the specific embodiments in FIG. 2, the control device 12 for generating training data for training the machine learning algorithm comprises a first providing unit 13, which is configured to provide first training data, a generation unit 14, which is configured to generate additional training data from at least one portion of the first training data, the additional training data being generated by the generation unit 14 by in each case applying, to all the training data included in the at least one portion of the first training data, an augmentation function randomly selected from a set of possible augmentation functions, and a second providing unit 15, which is configured to provide the first training data and the additional training data for training the machine learning algorithm.

The control device 12 for generating training data for training the machine learning algorithm, and in particular the generation unit 14, are thus configured such that the additional training data are generated simply by respectively applying a single augmentation function to the first training data, without, for example, data supplementation policies having to be learned first, which is complex and resource-intensive. As a result, additional training data can be generated in a simple manner and using few resources, meaning that the control device 12 can also be configured on conventional data processing systems or implemented by them. Unlike other control devices that are configured to execute augmentation methods, it is furthermore apparent that the control device 12 is configured such that good results can be achieved very reliably when generating additional training data.

Overall, therefore, an improved control device 12 for generating training data for training the machine learning algorithm is disclosed.

The first training data are in particular training data or samples for training the machine learning algorithm that are provided originally and stored in a memory 16, the control device 12 being configured to generate training data for training the machine learning algorithm, and to process the data stored in the memory 16 in such a way that, ultimately, even more additional training data derived from the first training data are available for training the machine learning algorithm.

In this case, for example, the generation unit can in turn be implemented on the basis of code that is stored in a memory and executable by a processor. Furthermore, the second providing unit can be a transmitter that is configured to transmit the first training data and the generated additional training data, or the final dataset of training data, to the training unit.

According to the specific embodiments in FIG. 2, the generation unit 14 is additionally configured to generate additional training data from the at least one portion of the first training data by furthermore in each case randomly selecting, for all the training data included in the at least one portion of the first training data, a degree of intensity for the augmentation function from a set of possible degrees of intensity, and generating additional training data by applying the corresponding, randomly selected augmentation function to the training data while using the corresponding, randomly selected degree of intensity.

According to the specific embodiments in FIG. 2, all the elements of the set of possible augmentation functions in turn also each have the same probability of being selected and all the elements of the set of possible degrees of intensity likewise each have the same probability of being selected.

In addition, the first training data are image data, for example digital image data, video data, radar data, LiDAR data, ultrasound data, image data obtained from movement data, or thermal images.

Moreover, the augmentation functions in turn comprise solarization of image data, posterization of image data, a brightness change to image data, shearing of image data, rotation of image data, a contrast change to image data and cutting of at least one portion of image data. Since augmentation functions of this kind are available, the control device 12 is thus configured to implement the supplementary additional training data in a simple manner on the basis of conventional augmentation functions, without augmentation functions having to be implemented first, which is complex and resource-intensive.

What is claimed is:

1. A method for generating training data for training a machine learning algorithm, the method comprising the following steps:
providing first training data;
generating additional training data from at least one portion of the first training data, wherein the additional training data are generated in each case by applying, to all training data included in the at least one portion of the first training data, an augmentation function randomly selected from a set of possible augmentation functions; and
providing the first training data and the additional training data for training the machine learning algorithm;
wherein the generating of the additional training data from the at least one portion of the first training data further includes, in each case, randomly selecting, for all the training data included in the at least one portion of the first training data, a degree of intensity for the augmentation function from a set of possible degrees of intensity, and generating the additional training data by applying the corresponding, randomly selected augmentation function to the training data while using the randomly selected degree of intensity.

2. The method as recited in claim 1, wherein all elements of the set of possible augmentation functions each have the same probability of being selected and/or all elements of the set of possible degrees of intensity each have the same probability of being selected.

3. The method as recited in claim 1, wherein the first training data are image data.

4. The method as recited in claim 3, wherein the augmentation functions include: solarization of image data, and/or posterization of image data, and/or a brightness change to image data, and/or shearing of image data, and/or rotation of image data, and/or a contrast change to image data and/or cutting of at least one portion of image data.

5. A method for training a machine learning algorithm, the method comprising:
providing first training data;
generating additional training data from at least one portion of the first training data, wherein the additional training data are generated in each case by applying, to all training data included in the at least one portion of the first training data, an augmentation function randomly selected from a set of possible augmentation functions;
providing the first training data and the additional training data for training the machine learning algorithm; and
training the machine learning algorithm based on the first training data and the additional training data;
wherein the generating of the additional training data from the at least one portion of the first training data further includes, in each case, randomly selecting, for all the training data included in the at least one portion of the first training data, a degree of intensity for the augmentation function from a set of possible degrees of intensity, and generating the additional training data by applying the corresponding, randomly selected augmentation function to the training data while using the randomly selected degree of intensity.

6. The method as recited in claim 5, wherein the machine learning algorithm is an algorithm for image classification or an algorithm for object recognition.

7. A method for classifying image data, the method comprising the following steps:
providing first training data;
generating additional training data from at least one portion of the first training data, wherein the additional training data are generated in each case by applying, to all training data included in the at least one portion of the first training data, an augmentation function randomly selected from a set of possible augmentation functions;
providing the first training data and the additional training data for training a machine learning algorithm;
training the machine learning algorithm based on the first training data and the additional training data; and
classifying the image data using the trained machine learning algorithm;
wherein the generating of the additional training data from the at least one portion of the first training data further includes, in each case, randomly selecting, for all the training data included in the at least one portion of the first training data, a degree of intensity for the augmentation function from a set of possible degrees of intensity, and generating the additional training data by applying the corresponding, randomly selected augmentation function to the training data while using the randomly selected degree of intensity.

8. A control device for generating training data for training a machine learning algorithm, the control device comprising:
a first providing unit configured to provide first training data;
a generation unit configured to generate additional training data from at least one portion of the first training data, wherein the additional training data are generated by the generation unit by in each case applying, to all the training data included in the at least one portion of the first training data, an augmentation function randomly selected from a set of possible augmentation functions; and
a second providing unit configured to provide the first training data and the additional training data for training the machine learning algorithm;
wherein the generation unit is configured to generate the additional training data from the at least one portion of the first training data by furthermore in each case randomly selecting, for all the training data included in the at least one portion of the first training data, a degree of intensity for the augmentation function from a set of possible degrees of intensity, and generating additional training data by applying the randomly selected augmentation function to the training data while using the randomly selected degree of intensity.

9. The control device as recited in claim 8, wherein all the elements of the set of possible augmentation functions each have the same probability of being selected and/or all the elements of the set of possible degrees of intensity each have the same probability of being selected.

10. The control device as recited in claim 8, wherein the first training data are image data.

11. The control device as recited in claim 10, wherein the augmentation functions include: solarization of image data, and/or posterization of image data, and/or a brightness change to image data, and/or shearing of image data, and/or rotation of image data, and/or a contrast change and/or cutting of at least one portion out of image data.

12. A control device for training a machine learning algorithm, wherein the control device is configured to train a machine learning algorithm based on training data generated by a first control device, the first control device including:
a first providing unit configured to provide first training data;
a generation unit configured to generate additional training data from at least one portion of the first training data, wherein the additional training data are generated by the generation unit by in each case applying, to all the training data included in the at least one portion of the first training data, an augmentation function randomly selected from a set of possible augmentation functions; and
a second providing unit configured to provide the first training data and the additional training data for training the machine learning algorithm;
wherein the generation unit is configured to generate the additional training data from the at least one portion of the first training data by furthermore in each case randomly selecting, for all the training data included in the at least one portion of the first training data, a degree of intensity for the augmentation function from a set of possible degrees of intensity, and generating additional training data by applying the randomly selected augmentation function to the training data while using the randomly selected degree of intensity.

13. The control device as recited in claim 12, wherein the machine learning algorithm is an algorithm for image classification or an algorithm for object recognition.

14. A control device for classifying image data, the control device being configured to classify the image data using a machine learning algorithm, the machine learning algorithm having been trained by a first control device configured to train the machine learning algorithm based on training data generated by a second control device, the second control device including:
   a first providing unit configured to provide first training data;
   a generation unit configured to generate additional training data from at least one portion of the first training data, wherein the additional training data are generated by the generation unit by in each case applying, to all the training data included in the at least one portion of the first training data, an augmentation function randomly selected from a set of possible augmentation functions; and
   a second providing unit configured to provide the first training data and the additional training data for training the machine learning algorithm;
   wherein the generation unit is configured to generate the additional training data from the at least one portion of the first training data by furthermore in each case randomly selecting, for all the training data included in the at least one portion of the first training data, a degree of intensity for the augmentation function from a set of possible degrees of intensity, and generating additional training data by applying the randomly selected augmentation function to the training data while using the randomly selected degree of intensity.

15. A non-transitory machine-readable storage medium on which is stored a computer program for generating training data for training a machine learning algorithm, the computer program, when executed by a computer, causing the computer to perform the following steps:
   providing first training data;
   generating additional training data from at least one portion of the first training data, wherein the additional training data are generated in each case by applying, to all training data included in the at least one portion of the first training data, an augmentation function randomly selected from a set of possible augmentation functions; and
   providing the first training data and the additional training data for training the machine learning algorithm;
   wherein the generating of the additional training data from the at least one portion of the first training data further includes, in each case, randomly selecting, for all the training data included in the at least one portion of the first training data, a degree of intensity for the augmentation function from a set of possible degrees of intensity, and generating the additional training data by applying the corresponding, randomly selected augmentation function to the training data while using the randomly selected degree of intensity.

* * * * *